(12) United States Patent
Lee (10) Patent No.: US 7,825,820 B2
(45) Date of Patent: Nov. 2, 2010

(54) SECURITY USING ELECTRONIC DEVICES

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 11/906,003

(22) Filed: Sep. 28, 2007

(65) Prior Publication Data

US 2009/0085760 A1 Apr. 2, 2009

(51) Int. Cl.
*G08B 21/00* (2006.01)
(52) U.S. Cl. ................... 340/669; 340/571; 340/665; 340/686.1; 340/689
(58) Field of Classification Search ............ 340/669, 340/692, 571, 683, 686.1, 689, 539.13, 665; 701/213
See application file for complete search history.

(56) References Cited

U.S. PATENT DOCUMENTS

| | | | |
|---|---|---|---|
| 6,323,846 B1 | 11/2001 | Westerman et al. | |
| 6,721,738 B2 * | 4/2004 | Verplaetse et al. | 707/6 |
| 6,970,095 B1 * | 11/2005 | Lee et al. | 340/669 |
| 7,305,714 B2 * | 12/2007 | Hamaguchi et al. | 726/34 |
| 7,415,355 B2 * | 8/2008 | Janky et al. | 701/213 |
| 7,453,355 B2 * | 11/2008 | Bergstrom et al. | 340/539.13 |
| 2007/0152983 A1 | 7/2007 | McKillop et al. | |

* cited by examiner

*Primary Examiner*—Davetta W Goins
(74) *Attorney, Agent, or Firm*—Blakely, Sokoloff, Taylor & Zafman LLP (57) ABSTRACT

Systems and methods for providing security to a user of an electronic device are provided. An electronic device can be configured to enter a prevention mode in response to detecting a force that exceeds a predetermined threshold, thereby providing security. Embodiments are described wherein the device, upon entering a prevention mode, may transmit a security transmission, in the form of a telephone call or an e-mail. This security transmission, when received by a security entity, can lead to the security entity dispatching an officer to the device's location, or to the security entity placing a telephone call to the device's owner, thereby providing security. Embodiments are also provided whereby the device, upon entering a prevention mode, may enter a lock-down mode. When in lock-down mode, the device may become inaccessible by any user, or alternatively may be accessed only if a security password is provided by the user.

28 Claims, 5 Drawing Sheets

SECURITY USING ELECTRONIC DEVICES

FIELD OF THE INVENTION

This can relate to systems and methods for using electronic devices to provide security.

BACKGROUND OF THE DISCLOSURE

The proliferation of electronic devices (e.g., cellular telephones and portable media players) and the various ways and places in which such devices are being used have created a need for the increased security of such devices from, for example, theft or unauthorized use. The proliferation of these devices has also created an opportunity for novel ways to provide security for the users of such devices.

In view of the foregoing, it would be desirable to have systems and methods for providing electronic devices with increased security features.

It would also be desirable to have systems and methods for providing electronic devices that prevent the unauthorized use thereof.

SUMMARY OF THE DISCLOSURE

Systems and methods for providing security using an electronic device are provided. For example, a device can be configured to transmit a security signal or transmission to an external security source when the device is vibrated or caused to accelerate above a predetermined threshold. The external security source may respond to the security signal and provide security to the device. When the threshold is exceeded, the device may be provided with additional or alternative security by being configured to enter a "lock-down" state that can render the device at least temporarily unusable.

Accordingly, an electronic device is provided that can enter a "security mode." When in a security mode, the device can be configured to transmit a security signal or transmission when the device is exposed to vibration or acceleration above a predetermined security threshold. The security signal can be any of a number of different communication formats, including, but not limited to, an automated telephone message and an e-mail. The security signal may be sent to any type of security provider, such as a police department or a private security service, thereby giving the security provider an opportunity to respond to the security transmission and provide security to the device.

Different security applications may require different levels of sensitivity to vibration and/or acceleration experienced by an electronic device. For example, in one embodiment, a device may be configured to send a security transmission when the vibration from a car engine starting is sensed. This could require a different vibration/acceleration security threshold than an embodiment in which a device is configured to send a security transmission when vibration from a door opening adjacent to the device is sensed. To address this, a device may be provided with multiple vibration/acceleration security threshold levels, which may be selected by a user of the device based on the desired application. This selection may be done separately from any entry into a security mode, or may be done when the user manually causes a security mode to be entered.

To provide greater security, an electronic device in a security mode can be configured to enter a "lock-down" mode when the device is exposed to vibration or acceleration above a predetermined lock-down threshold, thereby preventing unauthorized use of the device. The vibration/acceleration lock-down threshold for a lock-down mode may be set to be the same as a security threshold for sending a security transmission or may be set to a different level of vibration/acceleration.

An electronic device may be configured such that a lock-down mode may be terminated upon entry of a password by the user. A device may be further configured to prompt the user to contact any security providers associated with the device, in order to account for any security transmissions sent thereto due to any accidental tripping of the vibration/acceleration security threshold of the device, for example.

A security mode may be entered upon user command. A security mode may also be entered when the device has been idle, without user input and/or certain vibration/acceleration events, for a predetermined period of time. The period of idle time before a security mode is entered may be a default period set by the device manufacturer or may be a period set by the user of the device.

The aforementioned security features may be implemented in hardware or in software of an electronic device.

BRIEF DESCRIPTION OF THE DRAWINGS

The above and other advantages of the invention will become more apparent upon consideration of the following detailed description, taken in conjunction with the accompanying drawings, in which like reference characters refer to like parts throughout, and in which:

FIGS. 3A-4 are flowcharts of illustrative processes for providing security using an electronic device in accordance with embodiments of the invention.

DETAILED DESCRIPTION OF THE DISCLOSURE

Systems and methods for providing security to electronic devices are provided and described with reference to FIGS. 1-5B.

An electronic device of the invention may be any electronic device operative to enter a security mode and communicate with a security provider entity. In other embodiments, an electronic device of the invention may be any electronic device operative to enter a lock-down mode for preventing unauthorized use thereof. An electronic device of the invention can also be any electronic device operative to sound an alarm. The term "electronic device" can include, but is not limited to, music players, video players, still image players, game players, other media players, music recorders, video recorders, cameras, other media recorders, radios, medical equipment, calculators, cellular telephones, other wireless communication devices, personal digital assistants, programmable remote controls, pagers, laptop computers, printers, or combinations thereof. In some cases, the electronic devices may perform a single function (e.g., a device dedicated to playing music, such as an iPod™ marketed by Apple Inc., of Cupertino, Calif.) and, in other cases, the electronic devices may perform multiple functions (e.g., a device that plays music, displays video, stores pictures, and receives and transmits telephone calls, such as an iPhone™ marketed by Apple Inc.).

In any case, these electronic devices are generally any portable, mobile, hand-held, or miniature electronic device having at least one security feature in accordance with the principles of the invention so as to allow a user to listen to music, play games, record videos, take pictures, and/or conduct telephone calls wherever the user travels. Miniature electronic devices may have a form factor that is smaller than that of hand-held electronic devices, such as an iPod™. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof. Alternatively, electronic devices that incorporate at least one security feature of the invention may not be portable at all.

Figure 1:
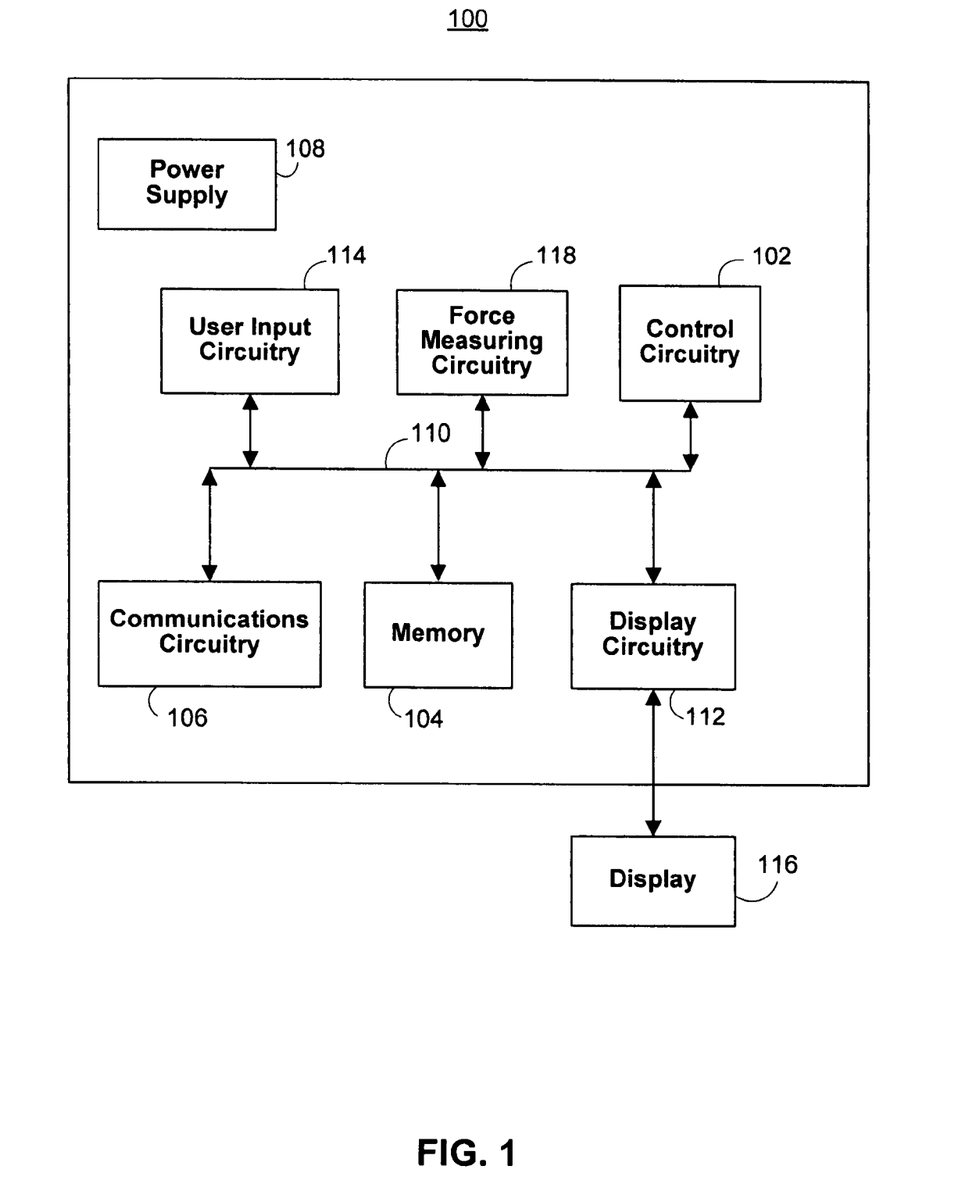
FIG. 1 is a simplified block diagram of an illustrative electronic device that provides security in accordance with an embodiment of the invention.

FIG. 1 illustrates a simplified block diagram of an illustrative electronic device in accordance with one embodiment of the invention. Electronic device 100 can include control circuitry 102, local client memory 104, communications circuitry 106, power supply 108, bus 110, display circuitry 112, user input circuitry 114, and display 116. In some embodiments, electronic device 100 can include more than one of each component, but for the sake of illustration, only one is shown in FIG. 1.

Memory 104 can include one or more storage mediums, including for example, a hard-drive, flash memory, permanent memory such as ROM, semi-permanent memory such as RAM, any other suitable type of storage component, or any combination thereof. Memory 104 can include cache memory, which may be one or more different types of memory used for temporarily storing data for electronic device applications. Memory 104 may store media data (e.g., music and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contacts information (e.g., telephone numbers and email addresses), calendar information, security information (e.g., contact information for security providers and security threshold levels), any other suitable data, or any combination thereof.

In some embodiments, memory 104 may store authentication information for a user to enter prior to accessing the functionality of the device, or to terminate a "lock-down" mode and/or "security" mode of the device. For example, memory 104 may store username and password combinations, or algorithms and keys for authenticating a string entered by the user (e.g., using a RSA algorithm). Memory 104 may store data for pairing itself or communicating with one or more devices or other entities (e.g., security entity 250 of FIG. 2) using a short-range communications protocol, for example.

Communications circuitry 106 can permit device 100 to communicate with one or more servers or other entities (e.g., security entity 250 of FIG. 2) using any suitable communications protocol. For example, communications circuitry 106 can include circuitry for wireless communication (e.g., short-range and/or long-range communication), such as Wi-Fi enabling circuitry that permits wireless communication according to one of the 802.11 standards. Other wireless protocol standards could also be used, either in alternative or in addition to the identified protocol, using electromagnetic waves, for example. Another network standard may be Bluetooth®, Ethernet, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Communications circuitry 106 can include circuitry that enables device 100 to be electrically coupled to another device (e.g., a computer or an accessory device) and communicate with that other device. Communications circuitry 106 can also include circuitry for sending and receiving media, including, but not limited to, microphones, amplifiers, digital signal processors (DSPs), image sensors (e.g., charge coupled devices (CCDs)) or optics (e.g., lenses, splitters, filters, etc.), antennas, receivers, transmitters, transceivers, and the like.

Display circuitry 112 can accept and/or generate signals for presenting media information (e.g., textual, graphical, tactile, and audible information) on display 116. For example, display circuitry 112 can include a coder/decoder (CODEC) to convert digital media signals into analog signals. Display circuitry 112 also can include display driver circuitry and/or circuitry for driving display driver(s). The display signals can be generated by control circuitry 102 or display circuitry 112. In one embodiment, display 116 can be integrated with or externally coupled to electronic device 100. Display 116 may take any of various forms, including, but not limited to, audio speakers, headphones, audio line-outs, visual displays, antennas, infrared ports, or combinations thereof.

Electronic device 100 also may be equipped with user input circuitry 114 that can permit a user to interact or interface with device 100. For example, user input circuitry 114 can take a variety of forms, including, but not limited to, buttons, electronic device pads, dials, trackballs, joysticks, switches, microphones, click wheels, touch screens, electronics for accepting audio and/or visual information, antennas, infrared ports, or combinations thereof. User input circuitry 114 may include a multi-touch screen such as that described in U.S. Pat. No. 6,323,846, which is incorporated by reference herein in its entirety. User input circuitry 114 may emulate a rotary phone or a multi-button electronic device pad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Furthermore, in certain embodiments of the invention, each one of the one or more input components of user input circuitry 114 of device 100 can be configured to provide one or more dedicated control functions for making selections or issuing commands associated with operating the device. By way of example, in the case of a music file player, the functions of user input circuitry 114 can be associated with powering up or down the device, opening or closing a menu, playing or stopping a song, changing a mode, and the like.

Bus 110 can provide a data transfer path for transferring data to, from, or between control circuitry 102, memory 104, communications circuitry 106, display circuitry 112, and user input circuitry 114, and any other components of device 100.

Power supply 108 can provide power to the components of device 100. In some embodiments, power supply 108 can be coupled to a power grid (e.g., a personal computer). In some embodiments, power supply 108 can include one or more batteries for providing power in a portable device (e.g., a cellular telephone). As another example, power supply 108 can be configured to generate power in a portable device from a natural source (e.g., solar power using solar cells).

As shown in FIG. 1, for example, device 100 can also include force measuring circuitry 118 coupled to bus 110. Force measuring circuitry 118 can be integrated with or coupled to user input circuitry 114, for example. Force measuring circuitry 118 can be any circuitry usable to detect a force that may cause device 100 to accelerate or to vibrate, such as one or more accelerometers or gyroscopes, for example.

Electronic device 100 may be configured to have a security mode. When the security mode is not activated, device 100 can function as it was designed to normally function, such as, for example, as a mobile telephone. The security mode of device 100 can be entered actively (e.g., by a user command) or passively (e.g., automatically after a predetermined idle period of time has passed). Passive security mode entry may be disabled by the user of the device. The idle time that may be required for passive security mode entry may be a default period of time set by the manufacturer of the device or may be a customized period of time set by a user of the device.

When a security mode of device 100 is activated force measuring circuitry 118 may be activated, and control circuitry 102 may monitor whether or not force measuring circuitry 118 detects a force applied to device 100 that exceeds a predetermined security threshold level. The predetermined security threshold level may be set by the user or may be preset by the manufacturer of device 100. The predetermined security threshold level may be stored in memory 104 of device 100, for example.

In some embodiments, a security mode may be omitted, and force measuring circuitry 118 may be active at all times. Force measuring circuitry 118 can be active whenever device 100 is turned on, or force measuring circuitry 118 can be configured to be active even when device 100 is off.

When force measuring circuitry 118 detects a force that is greater than a predetermined security threshold level, control circuitry 102 may cause device 100 to enter a prevention mode to provide security to a user of device 100. For example, when in a prevention mode, control circuitry 102 may cause communications circuitry 106 (e.g., a transceiver) of device 100 to send an outgoing security transmission or signal. Communications circuitry 106 may utilize RF signals, as commonly used in mobile wireless technology, wired communications technology, such as USB or FireWire, or any other type of communications technology or protocol described above. The transmission may be of any known format, and may comprise a telephone call, an e-mail, a text message, or any other type of data transmission signifying that a predetermined security threshold level has been exceeded. These security features may be implemented in either hardware or in software of device 100.

Figure 2:
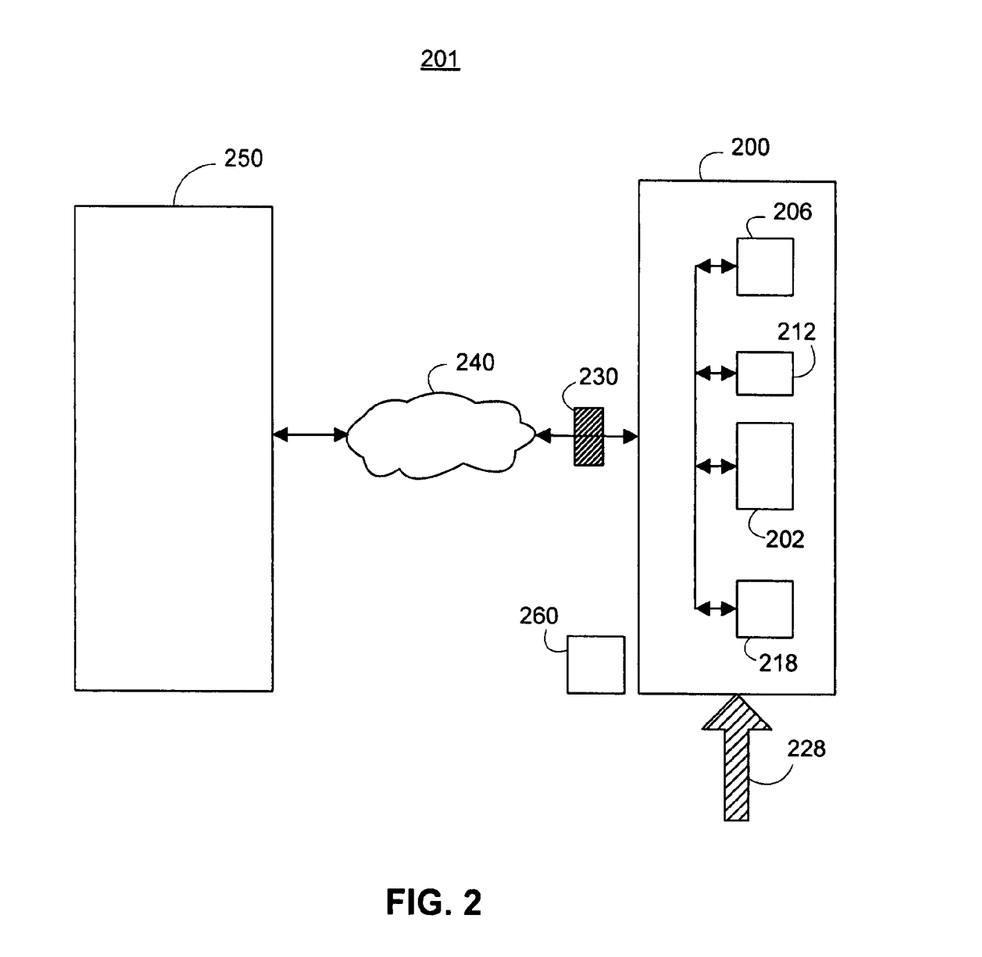
FIG. 2 is an illustrative schematic view of a system utilizing an electronic device that provides security in accordance with an embodiment of the invention.

FIG. 2 illustrates a schematic view of an illustrative system 201 that provides security in accordance with an embodiment of the invention. Security system 201 can include one or more electronic devices 200, which may be similar to electronic device 100, and one or more security entities 250. In one embodiment, electronic device 200 may be a mobile telephone that can transmit security signals comprising voice data in the form of a prerecorded request for assistance to a security entity 250. As noted above, the invention is not limited in this respect, as device 200 can be any type of electronic device described above and the security signals can be in any of the communication formats described above.

Electronic device 200 may enter a security mode actively or passively as described above with respect to device 100. An external force 228 may act upon device 200. If force 228 causes acceleration or vibration at an intensity greater than a predetermined security threshold level of force measuring circuitry 218 of device 200, then control circuitry 202 of device 200, for example, may send a security transmission 230 using communication circuitry 206 (e.g., a transceiver). Force 228 may be any force causing vibration or acceleration of device 200. Examples of force 228 can include, but are not limited to, the opening of a door or window adjacent or proximal to device 200, the engine vibration of an automobile containing device 200, and the abrupt deceleration of a person or transportation device carrying device 200 (e.g., in the instance of impact in a car accident), for example.

Different applications of the invention may require different security threshold levels of force. Therefore, device 200 may have multiple predetermined security threshold levels of acceleration/vibration stored in memory (e.g., memory 104 of device 100). A user of the device may select these one or more various security threshold levels based upon the desired security application, for example.

As described above, force 228 may cause device 200 to send a security transmission 230 (e.g., via a transmitter of communications circuitry 206) to a security entity 250. Device 200 and security entity 250 can communicate over communications link 240. Communications link 240 can include any suitable wired or wireless communications link, or combinations thereof, by which data (e.g., security transmission 230) may be exchanged between device 200 and security entity 250. For example, communications link 240 may include a satellite link, a fiber-optic link, a cable link, an Internet link, or any other suitable wired or wireless link. Communications link 240 may transmit data (e.g., security transmission 230) using any suitable communications protocol supported by the medium of communications link 240. Such communications protocols may include, for example, Wi-Fi (e.g., a 802.11 protocol), Ethernet, Bluetooth®, or any of the other protocols and technologies described above.

In an other embodiment, when force 228 exceeds an alarm threshold of force and device 200 is in a prevention mode, force 228 may cause device 200 to send a security transmission 230 (e.g., via an amplifier or speaker or display of communications circuitry 206 or display circuitry 212) to a user or anyone proximate to device 200 who may act as a security entity 250. For example, transmission 230 may be an audible alarm that sounds via device 200 (e.g., via a speaker) if accelerometer 218 detects that a force 228 exceeds a predetermined security threshold level of device 200. As another example, transmission 230 may be a visible alarm that is emitted via device 200 (e.g., via a display screen) if force measuring circuitry 218 detects that a force 228 exceeds a predetermined security threshold level of device 200.

Security entity 250 can be any entity or service that can provide a security response to security transmission 230, such as a private security service, agents of the manufacturer of electronic device 200, or a police department, for example. Receipt of security transmission 230 may give security entity 250 an opportunity to respond, thereby providing security to a user of device 200 or to device 200 itself. To provide security, security entity 250 may, upon receipt of security transmission 230, telephone the owner of device 200, or telephone an emergency contact number provided by the owner or user of device 200. Security entity 250 may also provide security by deactivating device 200 remotely or by causing an alarm within device 200 to be sounded. Security entity 250 may also provide security by using a GPS system, or an analogous position locating system, to obtain the location of device 200 so security personnel, in the form of private security guards or police officers, may be dispatched to the identified location to provide security, for example.

There are many applications for system 201 of FIG. 2. For example, system 201 may be used to prevent theft of device 200 or an object proximate to device 200 (e.g., animal or property or object 260). In such a system, device 200 can be attached or placed proximate to a door or window of a building or other property (e.g., an automobile) that a user may wish to protect when in a security mode, device 200 may send an outgoing security transmission 230 when force measuring circuitry 218 detects that force 228 (e.g., the opening of the door or window proximate device 200) exceeds a predetermined security threshold level of device 200. Transmission 230 may then be sent to security entity 250 to notify security entity 250 that a potential entry or disruption of the secured window or door has occurred. Security service or entity 250 can then attempt to protect or secure the property proximate to device 200 (e.g., by contacting the local police department and requesting that an officer be dispatched to investigate the potential entry or theft), thereby providing security to device 200 and/or property 260 proximate thereto.

Figure 3A:
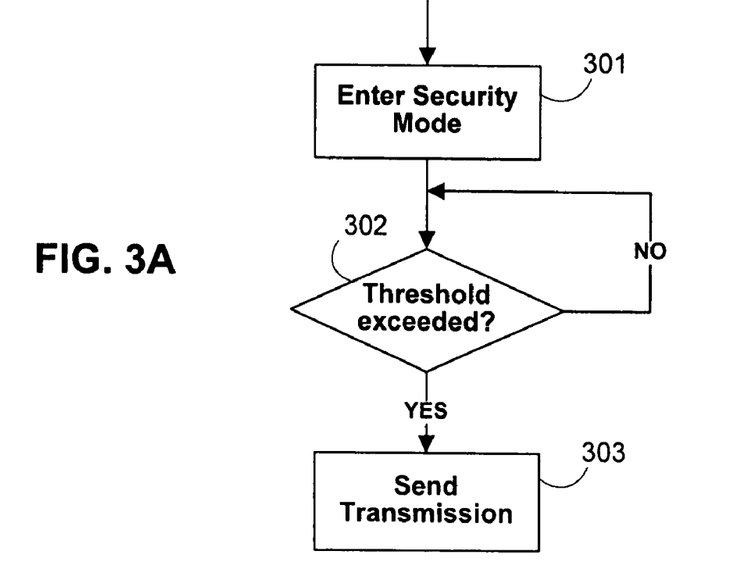

FIG. 3A shows a flowchart of an illustrative method for utilizing an electronic device to provide security in accordance with an embodiment of the invention. At step 301 a device may enter a security mode, either actively or passively as described above, and may engage the force measuring circuitry of the device. As previously noted, step 301 is not necessary, as the device's force measuring circuitry may always be active in some embodiments. At step 302, control circuitry of the device may monitor the force sensed by the force measuring circuitry to determine if it exceeds a predetermined security threshold level. When the force's intensity is less than a predetermined security threshold level, the device may remain in a security mode and no actions may be triggered. If the force level sensed by the force measuring circuitry of the device exceeds a predetermined security threshold, then the device may transmit a security transmission to a security entity at step 303.

Figure 3B:
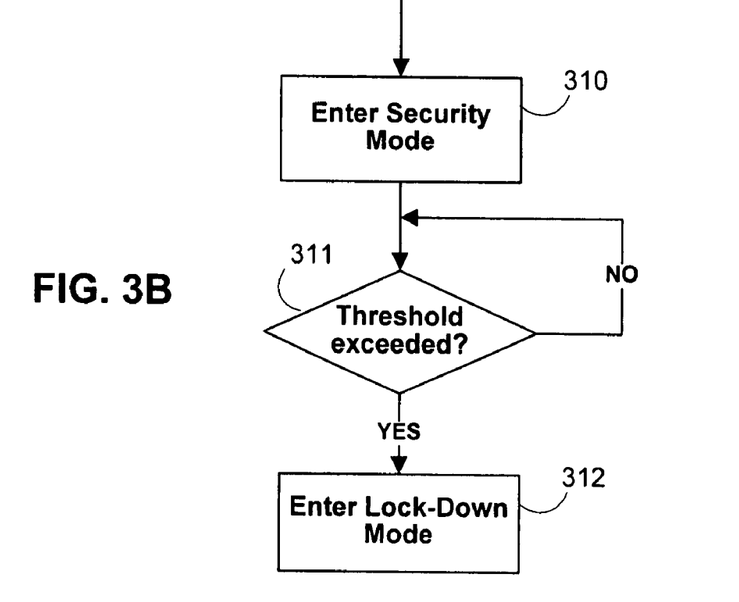

FIG. 3B shows a flowchart of an illustrative method for utilizing an electronic device to provide security in accordance with another embodiment of the invention. This embodiment relates to providing security in the form of preventing unauthorized use of the device. At step 310, a device may enter a security mode, either actively or passively as described above, and may engage the force measuring circuitry of the device. As previously noted, step 310 is not necessary, as the device's force measuring circuitry may always be active in some embodiments. At step 311, control circuitry of the device may monitor a force sensed by the force measuring circuitry to determine if it exceeds a predetermined lock-down threshold level. When force levels are less than a predetermined lock-down threshold level, the device may remain in a security mode and no action may be triggered. If the force level detected by the accelerometer exceeds a predetermined lock-down threshold level, then the device may enter a prevention mode, causing the device to enter a "lock-down" mode at step 312.

When in a lock-down mode, the device may become unresponsive to user commands, thereby providing security by preventing unauthorized use of the device. Lock-down mode may be terminated if the user enters a password, thereby allowing the owner of the device to overcome the security measures of the lock-down mode. This password may be preset by the manufacturer of the device, or may be selected and stored by the user in memory (e.g., memory 104 of device 100).

Figure 4:
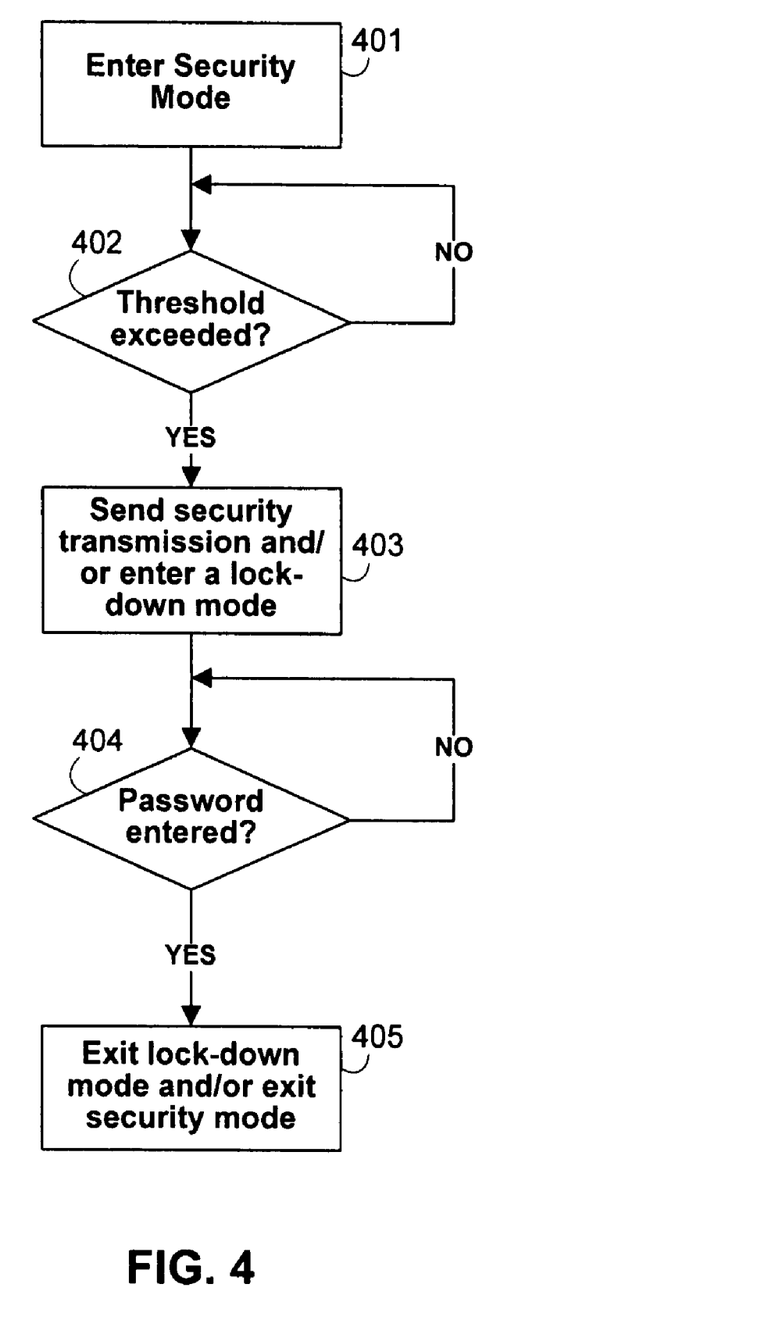

FIG. 4 shows a flowchart of an illustrative method for utilizing an electronic device to provide security in accordance with another embodiment of the invention. At step 401, a device may enter a security mode, either actively or passively, and may engage the force measuring circuitry of the device. As previously noted, step 401 is not necessary, as the device's force measuring circuitry may always be active in some embodiments. At step 402, control circuitry of the device may monitor the force sensed by the force measuring circuitry to determine if it exceeds a predetermined security threshold level. When the force sensed is less than a predetermined security threshold level, the device may remain in a security mode and no actions may be triggered. If the force sensed by the force measuring circuitry exceeds a predetermined security threshold level, the device may enter prevention mode, and may transmit a security transmission to a security entity at step 403. The device may also or alternatively enter a lock-down mode at step 403. At step 404, alphanumeric passwords may be input to the device. When nothing is entered or an incorrect password is input, the device may remain in lock-down mode and/or security mode, and the device may not resume its normal function. A permanent disabling of the device may occur when more than a predetermined number of incorrect passwords are entered, thereby providing even greater security to the device.

When a correct password is input to the device, lock-down mode and/or security mode may be terminated at step 405. In one embodiment, contact information of the security entity that may receive a security transmission sent at step 403 may be provided to the user, giving the user the opportunity to notify the security entity that the security transmission need not be investigated.

Figure 5A:
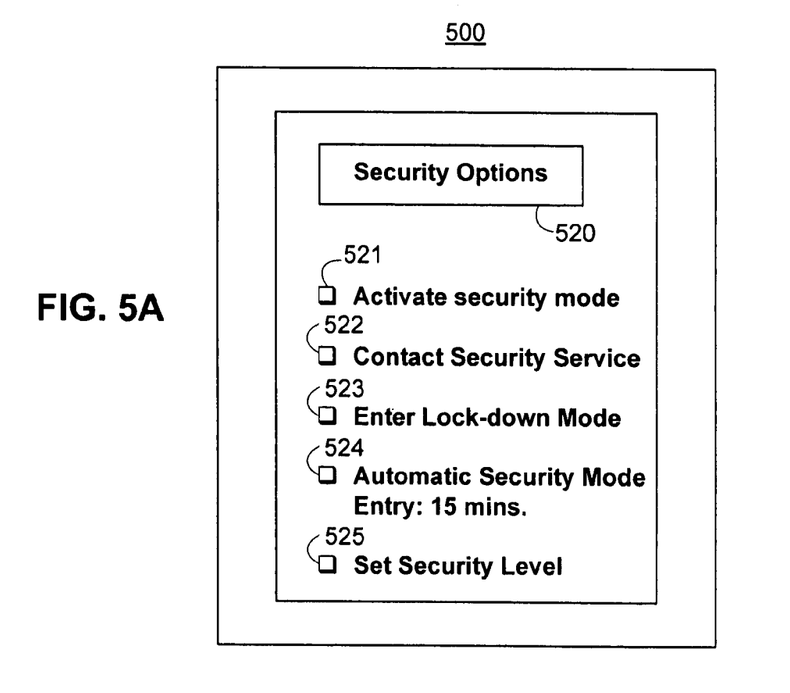
FIGS. 5A and 5B show illustrative graphic user interfaces on a display of an electronic device in accordance with an embodiment of the invention.
Figure 5B:
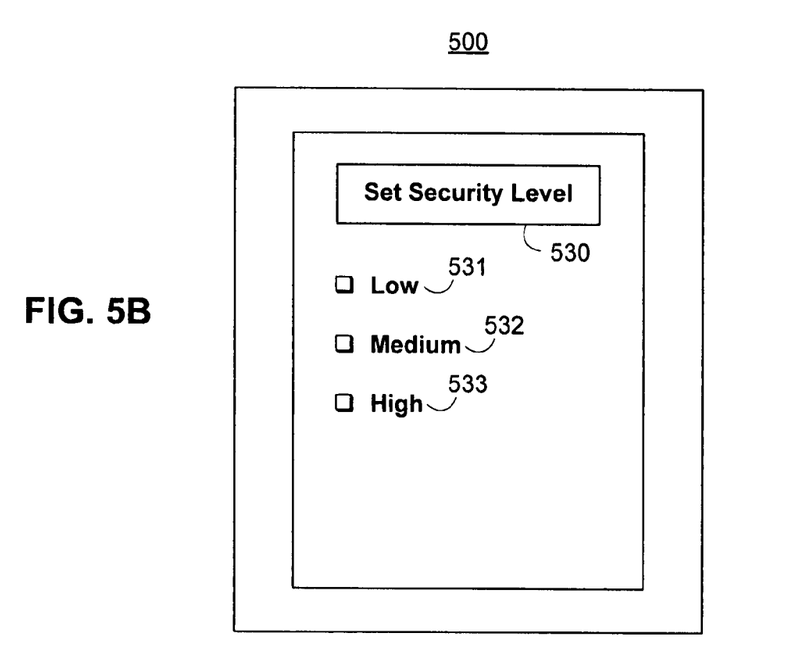

FIGS. 5A and 5B include sample screenshots of graphic user interfaces of a display of an electronic device 500 according to the invention. Electronic device 500 may be any device similar to device 100 or 200 described above.

FIG. 5A is a screenshot of a user interface that can be used to help a user of device 500 select exemplary options 521, 522, 523, 524, and 525. Option 521 can correspond to active entering of a security mode of device 500. Option 522 can correspond to transmitting a security transmission when the control circuitry (not shown) of device 500 determines that force measuring circuitry (not shown) of device 500 has sensed a force that exceeds a predetermined security threshold level.

Option 523 can correspond to entering a lock-down mode when the control circuitry of device 500 determines that using the force measuring circuitry of device 500 has detected a force that exceeds a predetermined lock-down threshold level. Option 524 can correspond to the settings for passive entry into a security mode. In the illustrative embodiment shown in FIG. 5A, the setting at option 524 is for entry into a security mode after 15 minutes of idle time (e.g., when no user inputs have been made to device 500). This option may be adjustable directly on screen 520 of device 500, or it can be adjusted on a different screen when the user selects option 524.

Option 525 can correspond to the predetermined security force level used while device 500 is in a security mode. FIG. 5B is a screenshot of a user interface on screen 530 of device 500 that can correspond to option 525, and may include, for example, inputs 531, 532, and 533. While this illustrative embodiment has three inputs corresponding to three predetermined force levels, the invention is not limited in this respect, and may include 100 predetermined force levels, or however many predetermined force levels a designer or user of the device may see fit. Input 531 may correspond to a low sensitivity, for applications where only a large force requires a security response (e.g., a car accident). Input 532 may correspond to a medium sensitivity, for applications where it is desirable for a moderate level of force to trigger a security response (e.g., the lifting or moving of the electronic device). Input 533 may correspond to a high sensitivity, for applications where it is desirable for only a small force to trigger a security response (e.g., the starting of a car engine).

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. An electronic device comprising:
   force measuring circuitry; and
   control circuitry coupled to the force measuring circuitry, wherein the control circuitry is configured to make a security determination when the force measuring circuitry detects a force level, the control circuitry is to complete the security determination when the detected force level exceeds one of a plurality of predetermined, different security threshold force levels that has been previously selected by a user of the device, and wherein the device is configured to enter a prevention mode when the control circuitry has made the security determination.

2. The device of claim 1, wherein the device is at least one of a mobile telephone, a wireless handheld device, a handheld computer, and an electronic organizer.

3. The device of claim 1 wherein the force measuring circuitry is an accelerometer.

4. The device of claim 1, further comprising communications circuitry coupled to the control circuitry, wherein the communications circuitry is configured to send a security transmission when the device is in the prevention mode.

5. The device of claim 1, wherein the security threshold levels include a lock-down threshold, and wherein the device enters a lock-down mode when in the prevention mode.

6. The device of claim 1, wherein the security threshold levels include an alarm threshold, and wherein the device emits at least one of an audible alarm and a visible alarm when the device is in the prevention mode.

7. The device of claim 4, wherein the transmission is a signal containing at least one of voice data and text data.

8. A system for providing security, comprising:
   a security entity; and
   the electronic device of claim 4, wherein the communications circuitry is configured to send the security transmission to the security entity.

9. The system of claim 8, wherein the security entity is a private security service.

10. The system of claim 8, wherein the device is at least one of a mobile telephone, a wireless handheld device, a handheld computer, and an electronic organizer.

11. The system of claim 8, wherein the force measuring circuitry is an accelerometer.

12. The device of claim 4, wherein the control circuitry is configured to enter a lock-down mode when the force measuring circuitry detects a force level corresponding to a lock-down threshold level.

13. The device of claim 12, wherein an alarm threshold level and the lock-down threshold level are the same level of force.

14. The device of claim 12, wherein an alarm threshold level and the lock-down threshold level are different levels of force.

15. The device of claim 5, wherein the device is configured to be unresponsive to a user command when in the lock-down mode.

16. The device of claim 5, wherein the device is configured to exit the lock-down mode upon entry of a password by a user.

17. The device of claim 12, wherein the device is configured to be unresponsive to a user command when in the lock-down mode.

18. The system of claim 8, wherein the device has a lock-down mode, and wherein the device is configured to enter the lock-down mode when the control circuitry has made the security determination.

19. The system of claim 18, wherein the device is configured to be unresponsive to a user command when in the lock-down mode.

20. The system of claim 18, wherein the device is configured to exit the lock-down mode upon entry of a password by a user.

21. The system of claim 8, further comprising an object proximal to the electronic device, wherein the force is applied by the object as a result of a force applied to the object.

22. A method of operating an electronic device for providing security, wherein the device includes control circuitry coupled to force measuring circuitry and communications circuitry, the method comprising:
   detecting an external force level with the force measuring circuitry;
   determining whether the detected external force level exceeds a security transmission threshold level for an object proximal to the electronic device with the control circuitry; and
   based upon the determination, sending a security transmission with the communications circuitry regarding the object proximal to the electronic device.

23. The method of claim 22, further comprising:
   receiving the security transmission with a security entity provided in a security network with the electronic device.

24. The method of claim 23, further comprising:
   responding to the received security transmission with the security entity.

25. A method of operating an electronic device for providing security, wherein the device includes control circuitry coupled to force measuring circuitry, the method comprising:
   detecting an external force level with the force measuring circuitry;
   determining whether the detected external force level corresponds to a lock-down threshold level with the control circuitry; and
   based upon the determination, putting the device in a lock-down mode with the control circuitry.

26. The electronic device of claim 1 wherein the device is configurable into a security mode of operation in which the force measuring circuitry is activated in response to entering the security mode.

27. The electronic device of claim 26 further comprising a graphical user interface to display security option graphic objects including one that indicates the security mode of operation.

28. The electronic device of claim 4, wherein the control circuitry is to terminate the prevention mode if a correct password is input to the device and, after terminating the prevention mode, is to provide contact information of a security entity to which the security transmission was made.

* * * * *

UNITED STATES PATENT AND TRADEMARK OFFICE
CERTIFICATE OF CORRECTION

| | | |
|---|---|---|
| PATENT NO. | : 7,825,820 B2 | Page 1 of 1 |
| APPLICATION NO. | : 11/906003 | |
| DATED | : November 2, 2010 | |
| INVENTOR(S) | : Michael M. Lee | |

It is certified that error appears in the above-identified patent and that said Letters Patent is hereby corrected as shown below:

In column 7, line 14, delete "protect when" and insert -- protect. When --, therefor.

In column 9, line 36, in claim 3, delete "claim 1" and insert -- claim 1, --, therefor.

Signed and Sealed this

Fifteenth Day of November, 2011

David J. Kappos
*Director of the United States Patent and Trademark Office*